July 7, 1925.  1,544,679
J. A. OLSON
PISTON AND PACKING
Filed Feb. 4, 1922
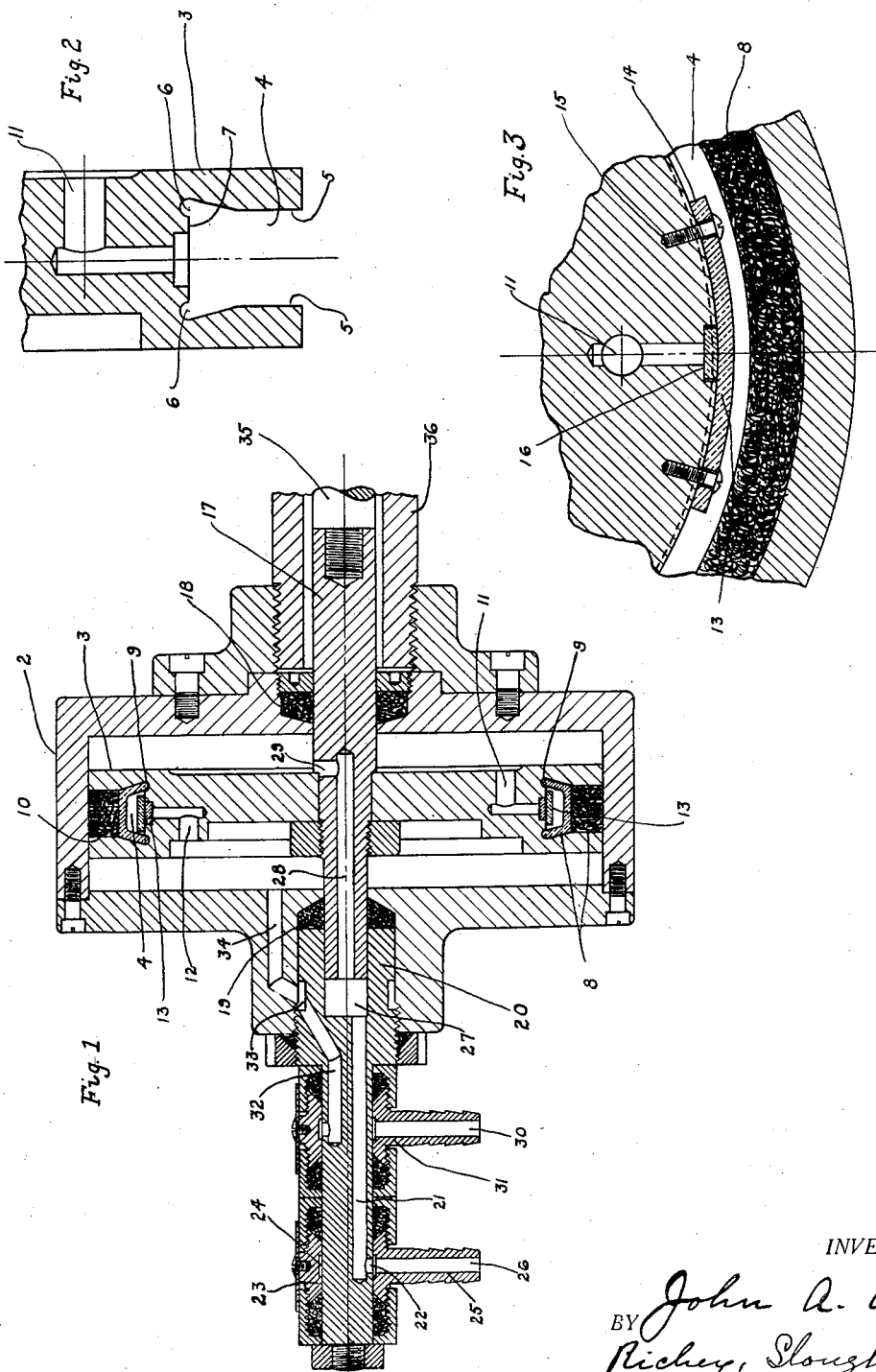
INVENTOR.
BY John A. Olson
Richey, Slough & Faler
ATTORNEY.

Patented July 7, 1925.

1,544,679

UNITED STATES PATENT OFFICE.

JOHN A. OLSON, OF CLEVELAND, OHIO, ASSIGNOR TO THE S-P MANUFACTURING COMPANY, OF CLEVELAND, OHIO, A CORPORATION OF OHIO.

PISTON AND PACKING.

Application filed February 4, 1922. Serial No. 534,100.

REISSUED

To all whom it may concern:

Be it known that I, JOHN A. OLSON, a citizen of the United States, residing at Cleveland, Ohio, county of Cuyahoga and State of Ohio, whose post office address is 872 East 72nd Street, have invented certain new and useful Improvements in Pistons and Packings, of which the following is a specification.

My invention relates to fluid pressure operating devices making use of pistons, and relates to such devices, which are adapted for operating chucks and machine vises. My invention also relates to means for preventing leakage between the piston and the cylinder of a fluid pressure operated device.

Among the objects of my invention are the following:

To provide a new and improved form of operating device for operating chucks and machine vises and the like, or any other mechanism ordinarily operated by a device of the character herein described;

To provide a new form of piston for said device;

To provide a new form of packing for said device;

To provide an endless self-sustaining ring having automatic fluid sealing engagement with the walls of an annular groove and being freely movable therein;

To provide novel means for holding the packing in position;

To provide an arrangement for holding the packing in its seat in place on the piston securely;

To provide means whereby the packing may be pressed against the cylinder by the cylinder pressure;

To provide in a device where the packing is held in place by the cylinder pressure, a single packing ring;

To provide other details of improvement tending to improve the efficiency and serviceability of devices of the above character.

To accomplish the foregoing and other useful ends, my invention comprises means hereinafter more fully set forth and claimed.

Referring to the accompanying sheet of drawings:—

Fig. 1 is a sectional view of my improved device shown attached to a spindle.

Fig. 2 is an enlarged detail of the same device, showing the seat for the packing, and a passage through which pressure is applied to the rear of the packing. This section corresponds to the section of the piston shown in the lower part of Fig. 1.

Fig. 3 is an enlarged detail showing the valve interposed between the passageway shown in Fig. 2, and the rear of the packing.

Heretofore, pneumatically operated pistons, have been provided for operating lathe chucks, but in these devices of the prior art, the packing has been held in position by spring means, pressing from the rear, that is, pressing the packing in a radial direction with respect to the piston, and thereby maintaining the packing against the cylinders to avoid leakage as much as possible. There were several objections to this construction, among these objections are the uneven distribution of the pressure from the rear, which pressure would be greater in one region, to wit the region immediately above the spring, than in the region between the springs. Another objection to this arrangement, is that the pressure that maintains the packing against the cylinder, is constant, whereas in my invention, the pressure behind the packing increases with the cylinder pressure, and, furthermore, is uniformly distributed throughout the whole rear section of the packing.

In operating devices of the character herein contemplated, the cylinder pressure used is quite high, and is subject to variation, and heretofore it has been difficult to hold the air and prevent leakage. It will be understood that the maintenance of the cylinder pressure is very important, inasmuch as this operating device, while designed for use in connection with any suitable instrumentality, is particularly adapted for use in connection with chucks and vises, of the kind wherein the grip of the chuck or vise, is dependent upon the maintenance of the cylinder pressure. Furthermore, the question of economy is involved to the extent, that it is more economical to operate devices of this character which do not leak, than those in which it is difficult to maintain the requisite cylinder pressure. One of the objects of this invention is to provide means for insuring against the loss of cylinder pressure due to leakage.

Referring more in detail to the drawings. My operating device comprises a cylinder, 2, within which a disc like member or, piston, 3, is designed to operate in a reciprocal manner. This piston is provided with a peripheral groove, 4, more clearly shown in Fig. 2. The sides, 5, of the groove, may, if desired, be constructed parallel as shown, a portion of the way down, and then the cavity is broadened near the foot of the groove and the annular recesses 6 may be formed along the side walls 5 and in the bottom wall 7. Preferably the walls 5 diverge as indicated in the drawings.

Within the groove 4 is positioned a packing 8 comprising two parts, one consisting of an endless, elastic, resilient ring 9 preferably composed of rubber and wear resisting ring 10 preferably composed of asbestos or similar material seating on the outer surface of the resilient ring. Both of these members are freely movable in the groove 4. The ring 9 is preferably made from a flat sheet of rubber by forming it into a circle of desired size and securing the ends together. Then the sides are folded in so that the ring is substantially horse shoe shaped in cross section and is inserted into the groove 4. The sides press outwardly against and conform to the configuration of the sides of the groove while the part of the ring intermediate the side edges retains its transverse curvature. Ring 9 is preferably of such size that the side edges normally seat tightly against the bottom wall and fill recesses 6. After ring 9 is in place in groove 4, member 10 is placed in the groove in contact with ring 9. If it is not an endless member its ends usually overlap as is customary with piston rings for internal combustion engine pistons. When a piston thus equipped with members 9 and 10 is inserted in a cylinder, as cylinder 2, member 10 is forced down into the groove 4 against ring 9 and flattens out the curved transverse wall portion thereof into substantially the form shown in Fig. 1 of the drawing, and forces the edges of ring 9 more firmly into recesses 6. It will be seen, by referring to Fig. 1, that between the channel, 4, and the front and rear faces of the piston, I provide ducts through which the cylinder pressure is conveyed to the rear of the transverse wall of the ring. One of these ducts, 11, the one that opens on the right-hand surface of the piston, is shown enlarged in Fig. 2. It is also shown in Figs. 1 and 3.

When fluid under pressure is admitted into the groove 4 through ducts 11 or 12 it at once presses against the inside of ring 9, forcing the sides tightly against and into fluid sealing contact with the walls of groove 4. It is essential that no fluid be permitted to get in between the ring 9 and the walls of groove 4 at this stage of the inflation for otherwise the sides of the ring will not engage with the walls of groove 4 closely enough to retain the fluid pressure in the groove, and one means of insuring this is the recesses 6 in which the edges of ring 9 normally seat in fluid sealing contact. As the pressure is increased the transverse flattened wall of ring 9 is restored to its originally curved form with coincident outward movement of member 10. When the ring 9 has reached its original size and shape further admission of fluid under pressure causes movement of the ring bodily outwardly in the groove as far as the member 10 permits. After member 10 becomes worn the ring 9 may travel as much as an eighth of an inch or more in the groove. When the pressure is released, ring 9 returns to its normal position in groove 4 with the side edges seating in recesses 6.

It will thus be seen that I have provided a resilient member which sustains itself in contact with the walls of a groove, which is freely movable within the groove to compensate for wear on a packing member and which operates automatically in conjunction with the walls of the groove to retain fluid under pressure therein under varying conditions of pressure or wear of parts associated therewith.

Referring to Fig. 2, it will be seen that the cylinder pressure to the right of the piston, 3, passes in through the duct, 11, to the channel, 4. In the uper part of Fig. 1, I show the other duct, 12, that extends from the left-hand surface of the piston to the groove, 4. Although I have shown only one groove connecting from each surface of the piston to the packing groove, it will be understood that I may provide more than one on each side. I provide in connection with these ducts, suitable valves, 13. These valves may be made of an elastic strip, 14, which extends over the mouth of the duct, the ends of which are secured in place by suitable screws, 15, as shown. The inner terminal of the duct serves as a seat for the valve member, 16, which valve member is suitably secured to the strip, 13. It will be seen therefore, that the medium that produces the cylinder pressure, passes in through the duct, 11, raises the member, 16, stretching the strip, 13, and passing into the slot, 4, intermediate the sides of and in the rear of the transverse wall of the ring 8. It will be understood that at the mouth of the duct, 12, there is a similar valve, therefore, the cylinder pressure inflates the packing, as indicated in Fig. 1, thereby producing a tight fit. This operation of the valve, associated with the duct, 11, of course, occurs when the cylinder pressure is on the right-hand of the piston. When the piston is to be reversed, the cylinder pressure to the right of the piston, of course, disappears, nevertheless the valves maintain the pressure behind the packing, and when the cylinder pressure is applied at the left of the piston, this pressure is also communicated by way of the duct, 12, to the rear of the packing in the event of any leakage by way of the duct, 11.

It will be seen that the piston is secured to the shaft, 17. This shaft is provided with the bearings in the right-hand head of the cylinder, and also with the bearings in the left-hand head of the cylinder. Around the right-hand bearings, I provide a suitable gland having packing, 18. Likewise about the left-hand bearings, I also provide a gland having packing, 19. It will be seen that the left section of the shaft, 19, reciprocates within an auxiliary bearing member, 20. This member, 20, is provided with a duct, 21, that terminates in an orifice, 22. Arranged over this orifice, I provide a ring, 23, having a circumferential groove, 24, located in juxtaposition to the orifice, 22. This ring is provided with an outlet terminal, 25, having a duct, 26, connecting with the groove, 24. With this arrangement, therefore, it will be seen that pneumatic pressure may be applied at the terminal of the duct, 26, which pressure will be transmitted by way of the duct, 21, to the cavity, 27, in the bearing member, 20, and thence through the duct, 28, in the shaft, 17, to the front part of the piston by way of the orifice, 29. By a similar arrangement, pneumatic pressure may be applied to the duct, 30, and thence through a circumferential groove in the member, 31, to the duct, 32, and hence, by way of the circumferential groove, 33, and duct, 34, to the left-hand cylinder space. It will be observed, that the shaft, 17, may be extended by means of extension rods, such as the extension rod, 35. As shown in Fig. 1, the whole device is mounted on the tube, 36, which may be in this instance a spindle of a lathe.

Having thus described my invention so that those skilled in the art may practice the same, what I desire to secure by Letters Patent is defined by what is claimed, it being understood that I have illustrated and described one embodiment of my invention herein in some detail only for purposes of illustration.

What I claim as my invention is:

1. The combination, with a piston provided with an annular peripheral groove, the inner portion of the side walls of which diverge toward the base, of a resilient packing ring seated within and enclosing the recess in said piston, said ring including a transverse wall having sides depending therefrom adapted to lie adjacent the diverging sides of the recess, packing material encircling said ring, and means for directing fluid under pressure into the portion of the groove in said piston enclosed by said packing ring, and a closure member secured within the groove in said piston by an elastic strip for trapping compressed fluid within the recess in said piston.

2. The combination with a piston provided with an annular peripheral groove the inner portion of the side walls of which diverge toward the base, of a resilient packing ring seated within and enclosing the recess in said piston, said ring including a transverse wall having sides depending therefrom adapted to lie adjacent the diverging sides of the recess, packing material encircling said ring, and means for directing fluid under pressure into the portion of the groove in said piston enclosed by said packing ring, and a resiliently operated closure member within the said groove for trapping fluid under pressure within the said recess.

3. The combination with a piston provided with an annular inwardly enlarged peripheral groove having a bottom wall and annular recesses therein, and means for conducting fluid under pressure through the piston into the bottom wall of the groove between the said recesses, of an endless resilient, annular member movably mounted in the said groove and a wear resisting packing member in the groove and encircling the said member, the said resilient member comprising a transverse wall extending across the groove and self sustaining inwardly diverging side walls normally seating in the said annular recesses and having fluid sealing contact with the recesses and side walls of the said groove for retaining fluid under pressure in the groove.

4. The combination with a piston provided with an annular, peripheral groove having a bottom wall with annular recesses therein, and means for conducting fluid under pressure through the piston into the groove between the said recesses, of an endless rubber annular member movably mounted in the said groove and a wear resisting packing member in the groove and encircling the said rubber member, the said rubber member comprising a transverse wall extending across the groove and self sustaining side walls having their edges normally seated in the recesses and having fluid sealing contact in the recesses and with the side walls of the said groove for retaining fluid under pressure in the groove.

5. A fluid pressure operated piston comprising a disc like member having an interiorly enlarged annular groove in the peripheral wall thereof, the groove being formed by a bottom wall and side walls diverging adjacent to the bottom wall, the bottom wall having annular recesses adjacent the said side walls, passages for conducting fluid under pressure through the said disc like member from either side through the bottom wall of the groove, an annular, self sustaining resilient member freely movable in the groove and having fluid sealing contact in the said recesses and with the side walls of the groove, an annular packing member in the groove seating on the resilient member and a resiliently operated closure in each of the said passages for trapping fluid under pressure in the said groove.

In witness whereof, I have hereunto signed my name this 31st day of Jan., 1922.

JOHN A. OLSON.